July 15, 1924.　　　　　　　　　　　　　　　　1,501,574
J. E. THROPP
FABRIC LAYING ATTACHMENT FOR TIRE MAKING MACHINES
Filed June 13　1919　　　3 Sheets-Sheet 1

Inventor:
John E. Thropp
by his attorneys

July 15, 1924. 1,501,574
J. E. THROPP
FABRIC LAYING ATTACHMENT FOR TIRE MAKING MACHINES
Filed June 13, 1919 3 Sheets-Sheet 2

Inventor:
John E. Thropp
by his attorneys

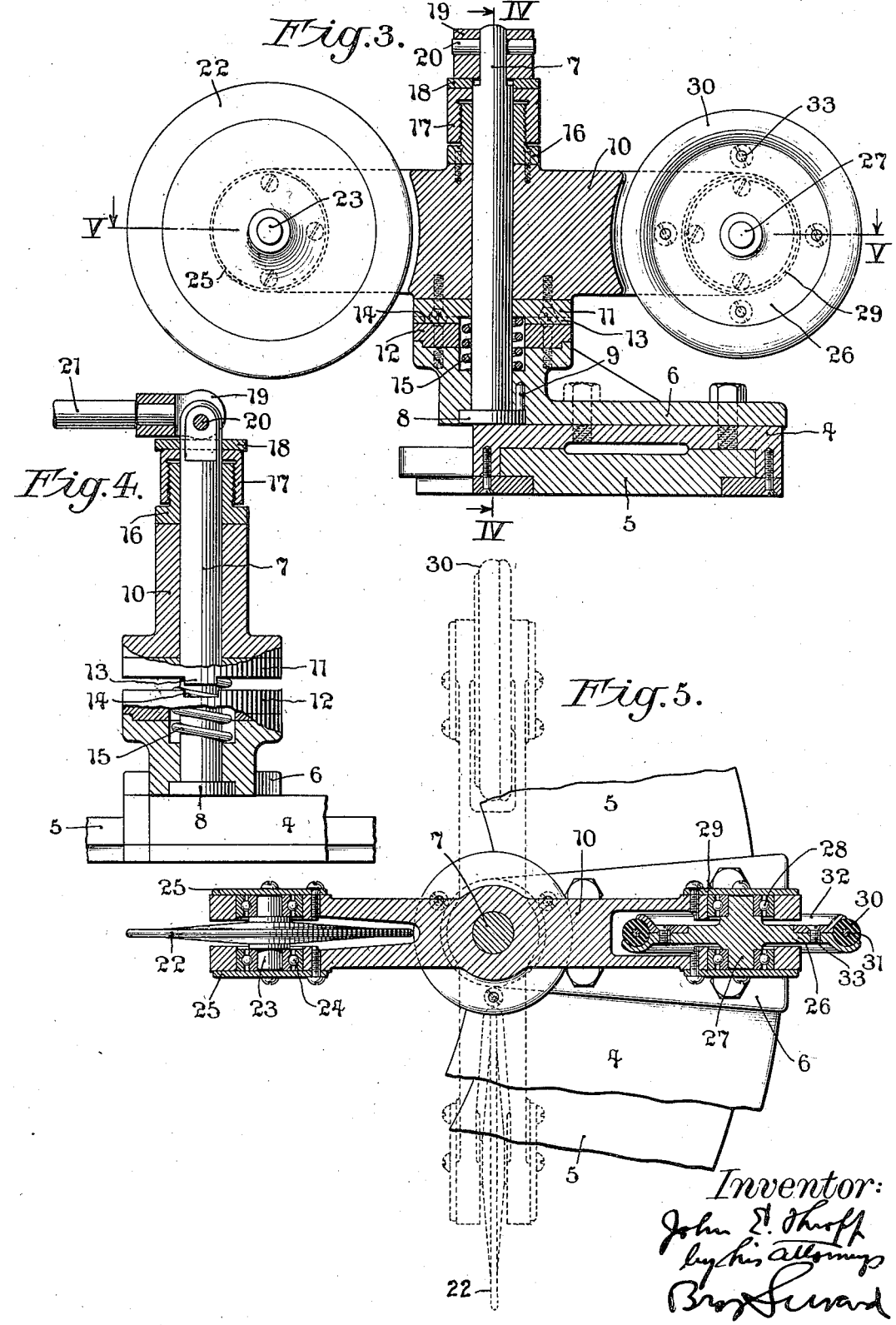

Patented July 15, 1924.

1,501,574

UNITED STATES PATENT OFFICE.

JOHN E. THROPP, OF TRENTON, NEW JERSEY, ASSIGNOR TO THE DeLASKI & THROPP CIRCULAR WOVEN TIRE COMPANY, OF TRENTON, NEW JERSEY, A CORPORATION OF NEW JERSEY.

FABRIC-LAYING ATTACHMENT FOR TIRE-MAKING MACHINES.

Application filed June 13, 1919. Serial No. 303,965.

*To all whom it may concern:*

Be it known that I, JOHN E. THROPP, a citizen of the United States, and resident of Trenton, in the county of Mercer and State of New Jersey, have invented a new and useful Improvement in Fabric-Laying Attachments for Tire-Making Machines, of which the following is a specification.

This invention relates to an improvement in fabric laying attachments for tire making machines, and has for an object, to provide a device of this nature which is dual in construction to enable an appropriate tool or implement to be brought into operation for performing two different steps of the fabric laying operation.

Another object consists in providing a device of this character, which embodies an improved form of fabric laying implement.

A further object consists in providing certain improvements in the form, construction and arrangement of the several parts, whereby the above named and other objects may be effectively attained.

As is well understood in the tire making industry, machines for manufacturing tires frequently include a power driven core, means for stretching fabric onto the periphery of the core and rollers for forming the remainder of the fabric down on the sides of the core. These rollers are commonly composed of steel and have a relatively thin edge. I have found that a roller having its edge composed of some material such as vulcanized rubber and having its edge comparatively wide or thick, is very effective and desirable for laying down the fabric on the core, except at points around the beads, at which latter places the thinner edged metallic roller is more desirable. With this thought in mind, I have devised the dual or double attachment constituting this invention. A practical embodiment of the invention is represented in the accompanying drawings in which:

Fig. 3 represents a section taken in the plane of the line III—III of Fig. 1, looking in the direction of the arrows.

Fig. 4 represents a detailed section taken in the plane of the line IV—IV of Fig. 3, looking in the direction of the arrows, and Fig. 5 represents a section taken in the plane of the line V—V of Fig. 3, looking in the direction of the arrows; the attachment being shown in a midway position in dotted lines.

Figure 1:
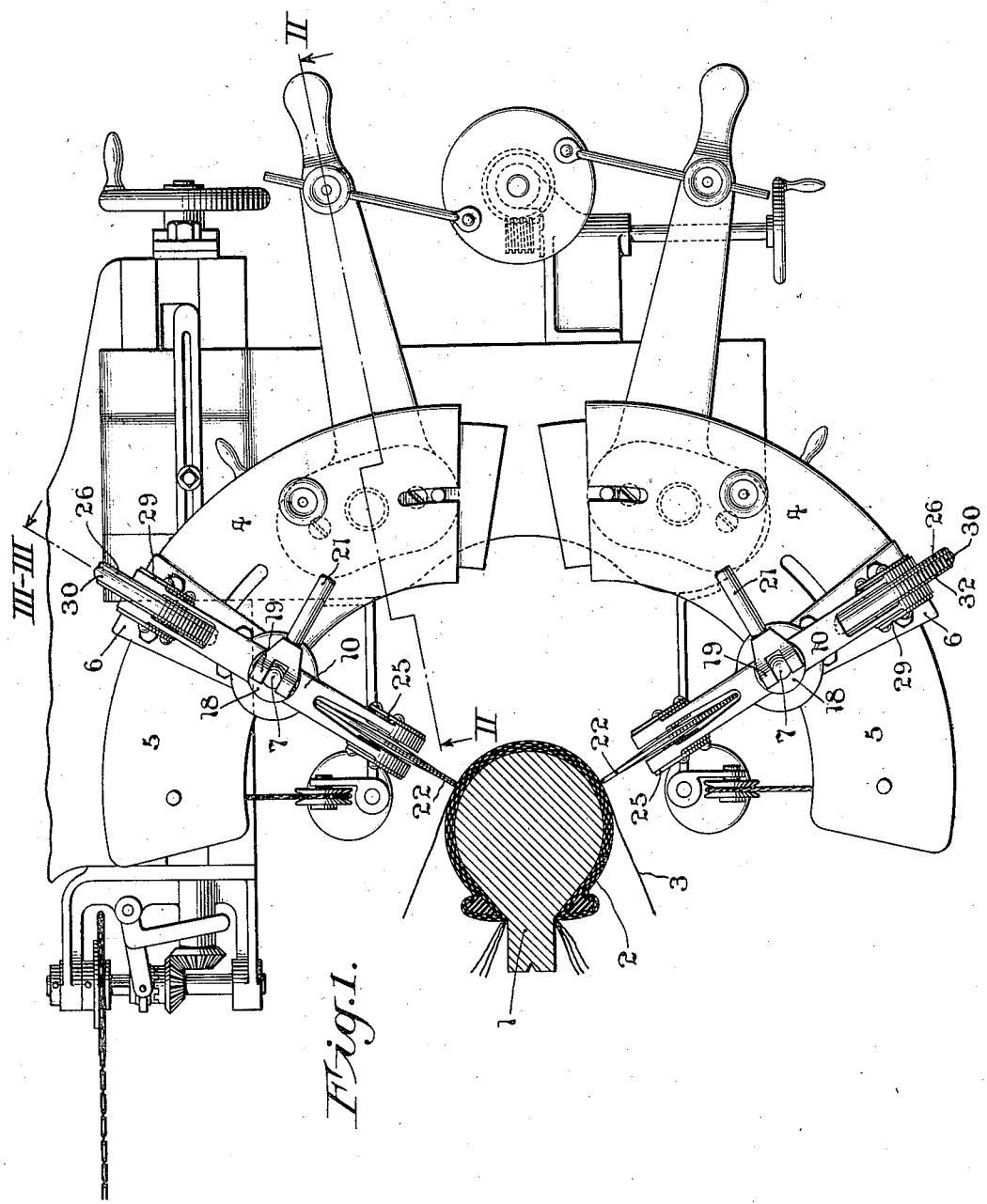
Fig. 1 represents a top plan view of my invention, together with the adjacent parts of a well known form of tire making machine.
Figure 2:
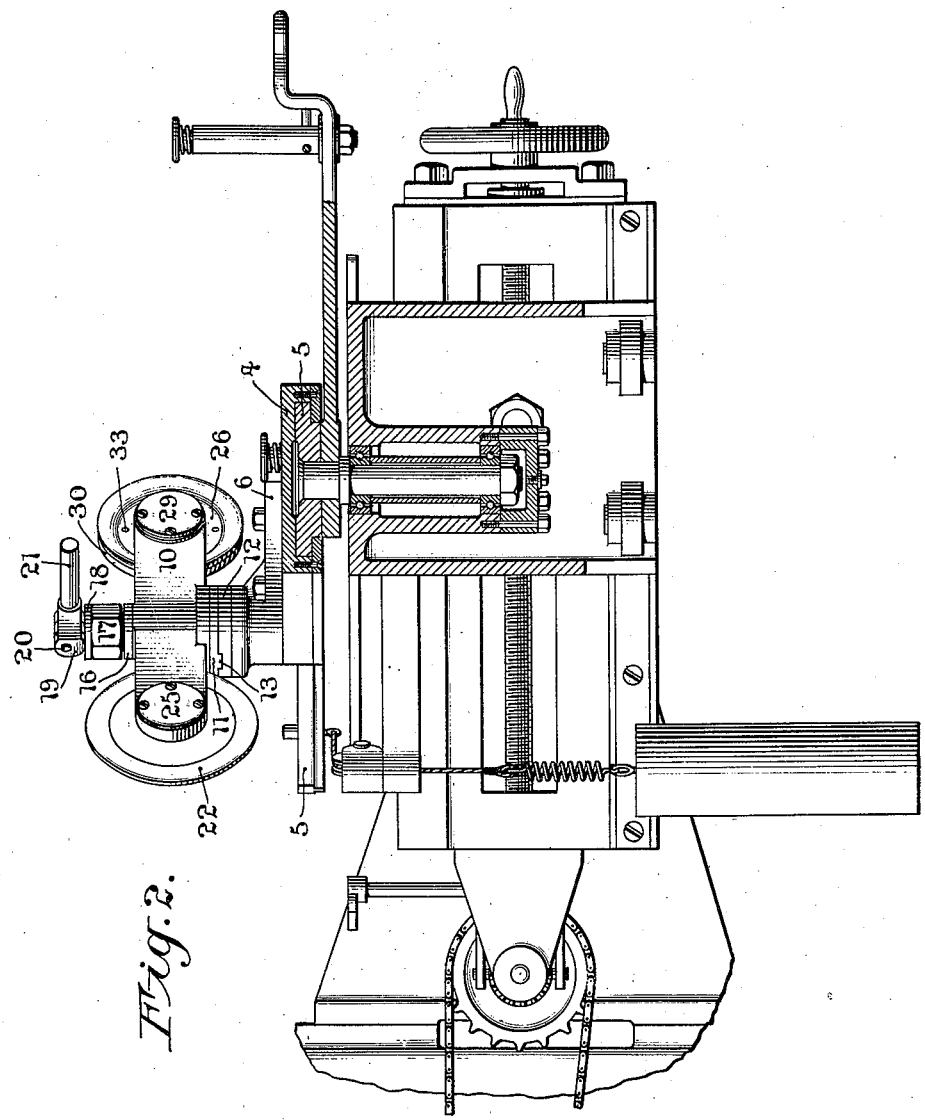
Fig. 2 represents a section taken in the plane of the line II—II of Fig. 1, looking in the direction of the arrows.

The core is denoted by 1 and a tire partly built thereon by 2. A layer of fabric to be applied on the partly built carcass is indicated by 3.

A pair of plates 4—4 are provided for supporting my improved device, and the said plates are carried on a pair of arms 5—5, which are mounted for radial and lateral movement with respect to the core 1. These plates and arms, together with their associated mechanism, correspond in construction and operation with the similar parts shown and described in United States patent to John E. Thropp, Peter D. Thropp and Albert deLaski, No. 1,119,326, dated December 1, 1914, entitled "Machine for making or building up pneumatic tires." Thus it will be undertsood that my present invention consists in an attachment to be applied to the tire making machine disclosed in the said patent, to take the place of the fabric laying rollers shown therein; and, therefore, the construction and operation of the parts for supporting and moving my present invention, will not be herein described.

While the drawings show a pair of these devices, only one will be described, as the two are identical. The plate 4 has a bracket 6 bolted thereto, and in the inner end of this bracket, an upright bearing pin 7 is mounted. The said pin has an enlarged lower end 8 to hold it against upward movement in the bracket 6, and a stud 9 protrudes from the end 8 into the bracket 6 to fix the pin 7 against rotary movement in the bracket.

A cross-head 10 is journaled on the pin 7 and has a clutch face 11 secured to the under side thereof in any suitable manner. The said clutch face 11 is designed to mate with another clutch face 12, which is fixed to the bracket 6. The clutch face 11 has a pair of teeth 13 formed thereon to enter corresponding recesses 14 in the clutch face 12. An expansion coil spring 15 is seated in a socket formed in the bracket 6 and surrounds the pin 7. Its upper end abuts the clutch face 11, and thereby normally tends to hold the two clutch faces apart and the teeth 13 out of the recesses 14.

The upper part of the cross-head 10 has a nipple 16 fixed thereto, which is exteriorly screw threaded for complementary engagement with a corresponding thread formed on the interior of a nut 17. The nipple 16 and the nut 17 have a bearing fit on the pin 7.

A washer 18 rests upon the top of the nut 17 and serves as a wearing surface for a cam eccentric 19, which is pivoted at 20 in the reduced upper end of the pin 7. The eccentric 19 has a handle 21 for manual operation thereof.

From the foregoing description, it will be apparent that when the eccentric 19 is thrown into one position, in which the handle 21 projects at right angles to the pin 7, the clutch faces 11 and 12 will be out of engagement, as shown in Fig. 4; and when the eccentric is reversed so that the handle 21 lies in the opposite position, the clutch faces 11 and 12 will be engaged, as shown in Fig. 3. The teeth and recesses 13 and 14 are so arranged that when they are in engagement one end or the other of the cross-head 10 is projecting toward the core 1.

The ends of the cross-head 10 are bifurcated to provide bearings for a pair of fabric laying rollers. One of these rollers is denoted by 22 and is composed of some suitable metal such as steel. It has a relatively narrow rounded edge, and a hub 23 which is rotatable in ball bearings 24 that are carried in the cross-head 10 and held in place by cheek plates 25.

The other roller consists of a disc 26 that has a hub 27 rotatably mounted in ball bearings 28 carried in the other end of the cross-head 10, which bearings are also held in place by cheek plates 29. The disc 26 has a peripheral groove designed to receive an annulus 30, which is circular in cross section and composed of some material such as vulcanized rubber having a hard center 31 that may consist of metal such as piano wire. This annulus 30 is clamped in the peripheral groove of the disc 26 by a ring 32, which is secured to the disc by screws 33. It will be noted that the annulus 30 protrudes from the disc 26 and ring 32 so as to present a curved operating edge to the work.

By reason of the fact that the annulus 30 consists of a material such as rubber, it has no injurious effect upon the fabric being laid down, which fabric is commonly impregnated with rubber.

In operation, after the fabric has been stretched upon the periphery of the core, the latter is rotated at a speed suitable for the laying down of the remainder of the fabric. The operator places the handle 21 of the eccentric 19 in such position that the clutch faces 11 and 12 are out of engagement, and then turns the cross-head 10 until the roller having the rubber edge 30 is presented toward the core 1. The eccentric 19 is now reversed so as to cause the teeth 13 to enter the recesses 14 and thereby lock the cross-head in this position. The mechanism for forcing the arms 5 laterally toward the core and for feeding them radially with respect to the core is then put in operation, and the roller having the rubber edge 30 moves radially along the sides of the core, pressing the fabric firmly and smoothly into contact therewith. As already stated, this operation is not only perfectly satisfactory from the point of view of a successful laying of the fabric, but the character of the working edge 30 insures that no injury or abrasion is caused the fabric. When it is necessary to force the fabric into a crease or sharp angle, or to lay it around the beads, the position of the cross-head 10 is reversed by manipulating the eccentric 19, as already described, and the roller 22 presented toward the core 1. This roller is then suitably moved by the supporting and actuating mechanism laterally and radially with respect to the core so as to press the fabric firmly in position, as will be clear to anyone skilled in this art, and as is clearly described in United States Patent No. 1,119,326 above mentioned.

The dotted lines in Fig. 5 of the drawings, denote a position of the cross-head 10 and parts carried thereby in moving from one position to the other, so as to present a different roll to the core.

It will be understood that the two heads 10 and their rollers are operated at the same time, one on each side of the core.

In case the annulus 30 becomes unduly worn, it may be readily replaced by loosening the adjacent parts in an obvious manner.

I desire it to be understood that various changes may be resorted to in the form, construction and arrangement of the several parts, without departing from the spirit and scope of my invention, and hence I do not intend to be limited to the details herein shown and described, except as they may be included in the claims.

What I claim is:

1. A device of the character described comprising, a support, a cross head pivoted to swing thereon, a fabric laying roller mounted at each end of the cross head to rotate in a plane substantially at right angles to the plane of swinging movement of the cross head, and means for locking the said cross head with either of said rollers presented to the work.

2. A device of the character described comprising, a support, a cross head pivoted to swing thereon, a fabric laying roller mounted at each end of the cross head to rotate in a plane substantially at right angles to the plane of swinging movement of the cross head, one of said rollers having a relatively narrow operating edge and the other of said rollers having a relatively wide operating edge.

3. A device of the character described comprising, a support, a cross head pivoted to swing thereon, a fabric laying roller mounted at each end of the cross head to rotate in a plane substantially at right angles to the plane of swinging movement of the cross head, one of said rollers having a relatively narrow metallic operating edge and the other of said rollers having a relatively wide rubber operating edge.

In testimony, that I claim the foregoing as my invention, I have signed my name this second day of June 1919.

JOHN E. THROPP.

Witnesses:
HARRY P. MESSLOR,
HAROLD SUTTERLEY.